United States Patent
Igura et al.

(10) Patent No.: US 7,978,383 B2
(45) Date of Patent: Jul. 12, 2011

(54) IMAGE PROCESSING CIRCUIT AND IMAGE PROCESSING METHOD

(75) Inventors: Kouichi Igura, Kasugai (JP); Tomohiro Fukuoka, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1236 days.

(21) Appl. No.: 11/642,055

(22) Filed: Dec. 20, 2006

(65) Prior Publication Data

US 2007/0139740 A1    Jun. 21, 2007

(30) Foreign Application Priority Data

Dec. 20, 2005 (JP) ................. 2005-366970

(51) Int. Cl.
*G03F 3/08* (2006.01)
(52) U.S. Cl. ........ 358/518; 358/1.9; 358/2.1; 250/208.1
(58) Field of Classification Search ............ 358/518, 358/1.9, 2.1; 250/208.1
See application file for complete search history.

(56) References Cited

U.S. PATENT DOCUMENTS

| | | |
|---|---|---|
| 2003/0169359 A1 | 9/2003 | Merrill et al. |
| 2003/0189100 A1 | 10/2003 | Yamada et al. |
| 2003/0189160 A1 | 10/2003 | Sakurai |
| 2003/0193011 A1* | 10/2003 | Takeda ........... 250/208.1 |
| 2003/0193590 A1 | 10/2003 | Hirai |
| 2004/0012696 A1 | 1/2004 | Teratani et al. |
| 2004/0165089 A1 | 8/2004 | An |
| 2004/0239317 A1 | 12/2004 | Goldfine et al. |
| 2005/0010621 A1 | 1/2005 | Pinto et al. |
| 2005/0238250 A1 | 10/2005 | Jo |
| 2008/0030801 A1 | 2/2008 | Yamada et al. |

FOREIGN PATENT DOCUMENTS

| | | |
|---|---|---|
| CN | 1525402 A | 9/2004 |
| JP | 7-30906 A | 1/1995 |
| JP | 10-62257 A | 3/1998 |
| JP | 2003-23570 A | 1/2003 |
| JP | 2003-304450 A | 10/2003 |
| JP | 2003-304544 A | 10/2003 |
| JP | 2003-304548 A | 10/2003 |

OTHER PUBLICATIONS

Gamal, Abbas El, "Trends in CMOS Image Sensor Technology and Design", Institute of Electrical and Electronics Engineers, Dec. 8, 2002, pp. 805-808, XP010626162.

* cited by examiner

*Primary Examiner* — Twyler L Haskins
*Assistant Examiner* — Michael Burleson
(74) *Attorney, Agent, or Firm* — Fujitsu Patent Center

(57) ABSTRACT

A circuit and method for processing an image to correct the pixel value of a sub-pixel included in color data to reduce color differences. The image processing circuit includes a plurality of defect determination circuits respectively corresponding to a plurality of sub-pixels (colors). Each defect determination circuit determines whether or not the corresponding sub-pixel, or first sub-pixel, includes a defect and generates a determination signal. The defect determination circuits provide each of a plurality of correction circuits respectively corresponding to a plurality of sub-pixels (colors) with the determination signals. Each correction circuit generates a corrected value for the corresponding first sub-pixel when at least one of the determination signal is indicative of a defect.

6 Claims, 3 Drawing Sheets

IMAGE PROCESSING CIRCUIT AND IMAGE PROCESSING METHOD

CROSS-REFERENCE TO RELATED APPLICATIONS

This application is based upon and claims the benefit of priority from the prior Japanese Patent Application No. 2005-366970, filed on Dec. 20, 2005, the entire contents of which are incorporated herein by reference.

BACKGROUND OF THE INVENTION

The present invention relates to an image processing circuit and an image processing method, and more particularly, to a circuit and method for correcting pixel defects included in color image data.

Solid state imaging devices, such as a CCD, are nowadays often used. A solid state device includes a matrix of pixels that receive light. Each pixel (i.e., sub-pixel) receives red (R), green (G), and blue (B) light and generates image data. The image data of the pixels configures color image data. The pixels of a solid-state imaging device may include structural defects due to factors resulting from the manufacturing process. Thus, the image data generated by a pixel having a defect must be corrected with the image data generated by pixels located in the proximity of that defective pixel.

A first prior art example of a solid state imaging device that generates color image data includes a filtering portion and an imaging portion. The filtering portion is formed by arranging one red filter (R), two green filters (Gr and Gb), and one blue filter (B) in a Bayer array. The imaging portion includes a plurality of light receiving elements for receiving the light that passes through each filter. Each light receiving element functions as a sub-pixel. Each pixel forming the color image data includes four filters and four light receiving elements. The color image data for each pixel is configured by the data for four colors (R, Gr, Gb, and B).

The light receiving elements included in a solid state imaging device may include structural defects resulting from the manufacturing process. For example, the data amount corresponding to the amount of received light, or the so-called photoelectric conversion efficiency, for a certain light receiving element may differ from that of the other light receiving elements. As a result, the data for some of the four colors in the image data for that light receiving element may differ from the actual color of the image subject. An image processing circuit compares the data value for each color in the image data generated by the solid state imaging device with a threshold value to check for defects in each light receiving element. When a defect is found, the image processing circuit corrects the color data generated by the defective light receiving element.

In the solid state imaging device of the first prior art example, a single pixel is formed by four light receiving elements laid out on the same plane. Accordingly, the incident light amount in each light receiving element is one fourth of that of a single pixel. Thus, each light receiving element can use only one fourth of the light irradiating a single pixel region. Further, each light receiving element receives the light that passes through the corresponding filter in the Bayer array. Therefore, the red color light and blue color light are received in alternate lines and the light for each color is received by every other pixel. This widens the intervals between the light receiving elements for each color. As a result, it is difficult to increase the resolution.

Accordingly, in a second prior art example of a solid state imaging device, light receiving elements are laid out in a direction perpendicular to a light receiving plane. In the second prior art example, the light entering a semiconductor substrate proceeds until reaching a depth corresponding to the wavelength of the light. For example, when three light receiving elements are superimposed in the direction perpendicular to the light receiving plane, each of the three light receiving elements converts the light of the wavelength corresponding to the location of that light receiving element into an electric signal. The light receiving area of each light receiving element is the same as the area of a single pixel. Accordingly, each light receiving element converts all of the light entering the pixel into electric signals. Thus, the usage rate of the incident light amount is high compared to the first prior art example, and the data amount increases. Further, the light receiving elements for each color are arranged adjacent to one another. This enables the resolution to be increased.

SUMMARY OF THE INVENTION

In the solid state imaging device of the second prior art example, the light receiving element in a pixel may include a defect. Further, in the second prior art example, the light receiving elements are laid out in the direction perpendicular to the light receiving plane. Thus, if the light receiving element for a single color includes a defect, there is a high possibility of the light receiving elements for the other colors in the same pixel including a defect. However, the above image processing circuit does not detect the defect when the data values for the other colors do not exceed the threshold value even if the defect for the single color is detected. As a result, the defective color data is not corrected. In such a case, the color data would differ from the actual color of the image subject and result in a color difference.

The present invention provides an image processing circuit and an image processing method for correcting the value of a pixel included in color data to reduce color differences.

One aspect of the present invention is an image processing circuit for processing color data generated by a solid state imaging device. The solid state imaging device includes a matrix of a plurality of pixels, with each pixel including a plurality of sub-pixels arranged in a plurality of superimposed layers, and each sub-pixel corresponding to different color data. The image processing circuit includes a plurality of defect determination circuits respectively arranged in correspondence with the plurality of sub-pixels. The sub-pixel corresponding to each defect determination circuit defines a first sub-pixel, and a sub-pixel arranged near the first sub-pixel in the same layer as the first sub-pixel defines a second sub-pixel. Each of the defect determination circuits determines whether or not the corresponding first sub-pixel includes a defect based on the color data of the first sub-pixel and the color data of the second sub-pixel and generates a determination signal. A plurality of correction circuits are connected to each of the plurality of defect determination circuits, with the correction circuits respectively corresponding to the plurality of sub-pixels. Each of the correction circuits generates a corrected value for the corresponding first sub-pixel based on the color data of the first sub-pixel and the color data of the second sub-pixel when at least one of the determination signals is indicative of a defect.

A further aspect of the present invention is an image processing circuit for processing color data generated by a solid state imaging device. The solid state imaging device includes a matrix of a plurality of pixels. Each pixel includes a plurality of sub-pixels arranged in a plurality of superimposed layers, and each sub-pixel corresponds to different color data. The image processing circuit includes a plurality of first defect determination circuits respectively arranged in correspondence with the plurality of sub-pixels. The sub-pixel corresponding to each first defect determination circuit defines a first sub-pixel, and a sub-pixel arranged near the first sub-pixel in the same layer as the first sub-pixel defines a second sub-pixel. Each of the first defect determination circuits determines whether or not the corresponding first sub-pixel includes a defect based on the color data of the first sub-pixel and the color data of the second sub-pixel and generates a first determination signal. A plurality of second defect determination circuits respectively is arranged in correspondence with the plurality of sub-pixels. Each of the second defect determination circuits is connected to one or more first defect determination circuits associated with one or more first sub-pixels differing from the corresponding first sub-pixel. When the one or more first defect determination circuits associated with the one or more different first sub-pixels generates the first determination signal indicative of a defect, each second defect determination circuit determines whether or not the corresponding first sub-pixel includes a defect based on the color data of the first sub-pixel and the color data of the second sub-pixel and generates a second determination signal. A plurality of correction circuits respectively arranged in correspondence with the plurality of sub-pixels. Each of the correction circuits is connected to the corresponding first and second defect determination circuits. Each of the correction circuits generates a corrected value for the corresponding first sub-pixel based on the color data of the first sub-pixel and the color data of the second sub-pixel when at least one of the first and second determination signals is indicative of a defect.

Another aspect of the present invention is a method for processing color data generated by a solid state imaging device. The solid state imaging device includes a matrix of a plurality of pixels. Each pixel includes a plurality of sub-pixels arranged in a plurality of superimposed layers, and each sub-pixel corresponds to different color data. The method includes providing each of a plurality of defect determination circuits respectively corresponding to the plurality of sub-pixels with color data of the corresponding sub-pixel defining a first sub-pixel and color data of a sub-pixel defining a second sub-pixel that is arranged near the first sub-pixel in the same layer as the first-sub pixel, generating a determination signal by determining whether or not the first sub-pixel includes a defect based on the color data of the first sub-pixel and the color data of the second sub-pixel with the corresponding defect determination circuit, providing each of a plurality of correction circuits respectively corresponding to the plurality of sub-pixels with the determination signals generated by the defect determination circuits, and generating a corrected value for the first sub-pixel based on the color data of the first sub-pixel and the color data of the second sub-pixel with the corresponding correction circuit when at least one of the determination signals is indicative of a defect.

A further aspect of the present invention is a method for processing color data generated by a solid state imaging device. The solid state imaging device includes a matrix of a plurality of pixels. Each pixel includes a plurality of sub-pixels arranged in a plurality of superimposed layers, and each sub-pixel corresponds to different color data. The method includes providing each of a plurality of first defect determination circuits respectively corresponding to the plurality of sub-pixels with color data of the corresponding sub-pixel defining a first sub-pixel and color data of a sub-pixel defining a second sub-pixel that is arranged near the first sub-pixel in the same layer as the first-sub pixel, generating a first determination signal by determining whether or not the first sub-pixel includes a defect based on the color data of the first sub-pixel and the color data of the second sub-pixel with the corresponding first defect determination circuit, providing each of a plurality of second defect determination circuits respectively corresponding to the plurality of sub-pixels with one or more first determination signals of one or more first defect determination circuits associated with one or more first sub-pixels differing from the corresponding first sub-pixel, generating a second determination signal by determining whether or not the first sub-pixel includes a defect based on the color data of the first sub-pixel and the color data of the second sub-pixel with the corresponding second defect determination circuit when the one or more first defect determination circuits associated with the one or more different first sub-pixels generates the first determination signal indicative of a defect, providing each of a plurality of correction circuits respectively corresponding to the plurality of sub-pixels with the first determination signal of the corresponding first defect determination circuit and the second determination signal of the corresponding second defect determination circuit, and generating a corrected value for the first sub-pixel with the corresponding correction circuit based on the color data of the first sub-pixel and the color data of the second sub-pixel when at least one of the first and second determination signals is indicative of a defect.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
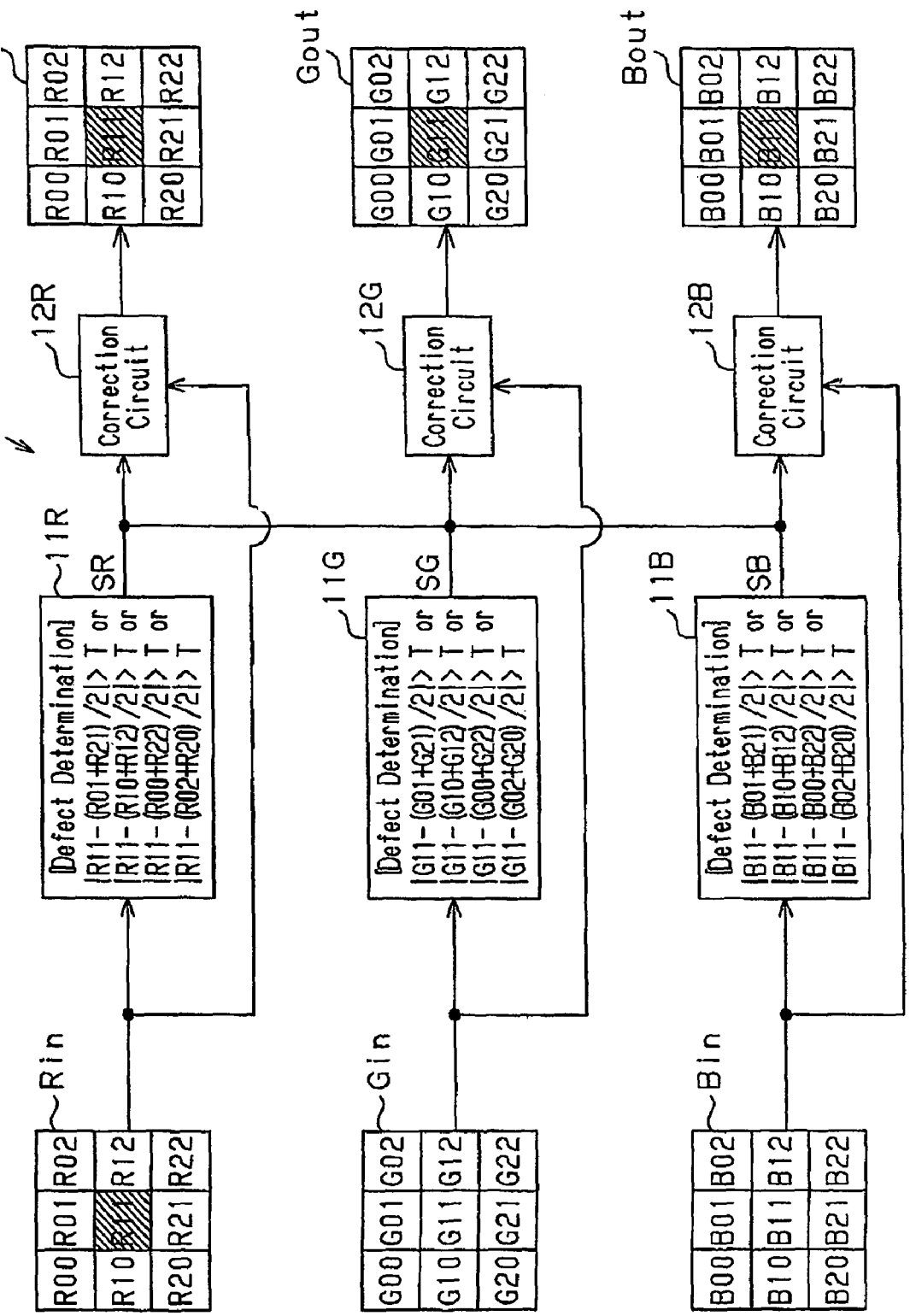
FIG. 1 is a schematic block circuit diagram of an image processing circuit according to a first embodiment of the present invention.

In the drawings, like numerals are used for like elements throughout.

With reference to FIG. 1, an image processing circuit 10 determines whether a pixel (sub-pixel) includes a defect based on color data Rin, Gin, Bin for red (R), green (G), and blue (B). When determining that a sub-pixel for at least one color has a defect, the image processing circuit 10 performs a correction process on the sub pixels for each color.

Figure 2:
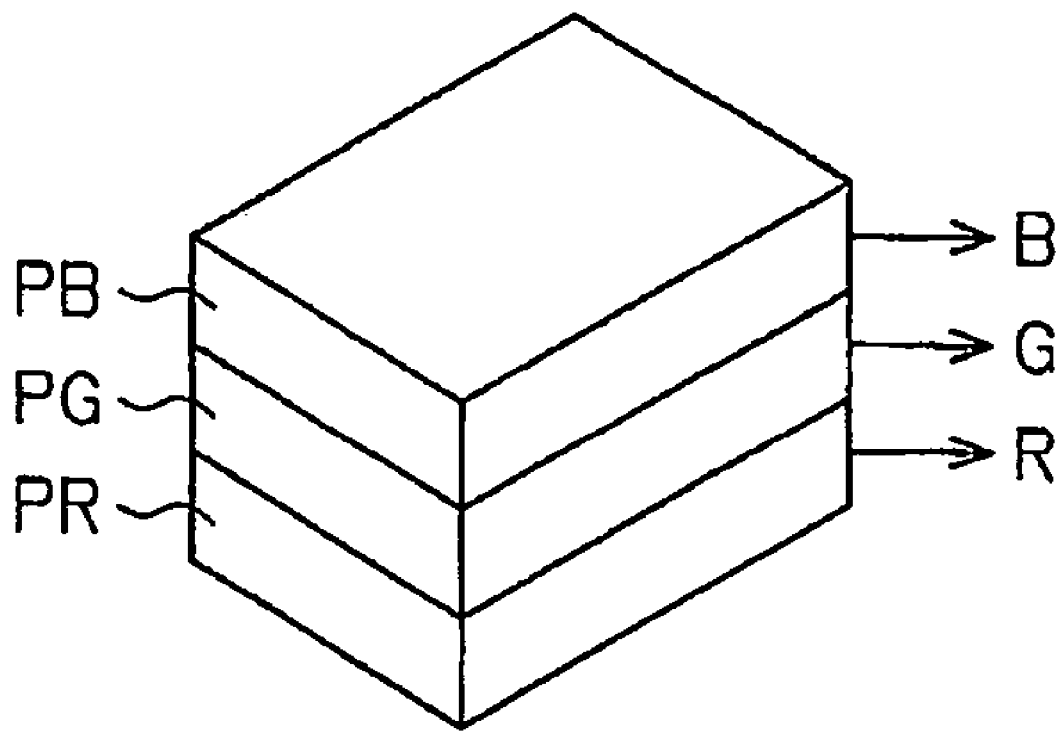
FIG. 2 is a schematic diagram showing a pixel.

The color data Rin, Gin, and Bin for each color is generated by a solid state imaging device, such as a CMOS image sensor. Referring to FIG. 2, each pixel of the solid state imaging device is formed by three layers of light receiving elements (sub-pixels), or pixel sensors PB, PG, and PR, that are embedded in a silicon substrate. Silicon absorbs light of different colors at different depths. Thus, each of the layers of the pixels sensors PB, PG, and PR retrieves the color having a wavelength corresponding to its depth to generate a signal representing a pixel value corresponding to the amount of incident light.

The image processing circuit 10 shown in FIG. 1 performs a defect determination process and a correction process based on the pixel value of a pixel (sub-pixel) that is subject to processing and a pixel value of at least one proximal pixel (sub-pixel) located proximal to the processing subject pixel. In the first embodiment, eight peripheral pixels (sub-pixels) adjacent to the processing subject pixel are used as the proximal pixels. For example, the red color data Rin includes the pixel value for a processing subject pixel R11 and the pixel values for eight peripheral pixels R00, R01, R02, R10, R12, R20, R21, and R22 (R00 to R22). That is, the color data Rin includes the pixel values for three rows and three columns of pixels. Based on the pixel value for the pixel R11 and the pixel values for the pixels R00 to R22, the image processing circuit 10 determines whether or not the processing subject pixel R11 includes a defect. When the pixel R11 includes a defect, the image processing circuit 10 corrects the pixel value of the pixel R11 by generating a corrected pixel value. In the same manner, the green color data Gin includes the pixel value for a processing subject pixel G11 and the pixel values for eight peripheral pixels G00, G01, G02, G10, G12, G20, G21, and G22 (G00 to G22). The image processing circuit 10 determines whether or not the processing subject pixel G11 includes a defect. When the pixel G11 includes a defect, the image processing circuit 10 corrects the pixel value of the pixel G11 by generating a corrected pixel value. In the same manner, the blue color data Bin includes the pixel value for a processing subject pixel B11 and the pixel values for eight peripheral pixels B00, B01, B02, B10, B12, B20, B21, and B22 (B00 to B22). The image processing circuit 10 determines whether or not the processing subject pixel B11 includes a defect. When the pixel B11 includes a defect, the image processing circuit 10 corrects the pixel value of the pixel B11 by generating a corrected pixel value.

The image processing circuit 10 includes three defect determination circuits 11R, 11G, and 11B and three correction circuits 12R, 12G, and 12B corresponding to the three colors, respectively. A threshold value T used to determine defects is set for each of the defect determination circuits 11R, 11G, and 11B.

The defect determination circuit 11R for the red color determines whether or not the processing subject pixel R11 includes a defect. For example, in the first embodiment, the defect determination circuit 11R obtains a difference between the pixel value for the processing subject pixel R11 and an average value of the pixel values for a set of pixels lying along a line extending through the processing subject pixel R11. Then, the defect determination circuit 11R compares the absolute value of the difference (hereafter referred to as the difference value) with the threshold value T. The defect determination circuit 11R performs such a comparison process on each set of the peripheral pixels (four sets). The defect determination circuit 11R determines that the processing subject pixel R11 includes a defect when at least one of the difference values is greater than the threshold value T and determines that the processing subject pixel R11 is free from defects when each one of the difference values is less than or equal to the threshold value T.

More specifically, based on the image value of the processing subject pixel R11 and the pixel values of the set of the peripheral pixels R01 and R21, the defect determination circuit 11R compares the difference value of |R11−(R01+R21)/2| with the threshold value T. In the same manner, the defect determination circuit 11R compares the difference value of |R11−(R10+R12)/2| with the threshold value T, the difference value of |R11−(R00+R22)/2| with the threshold value T, and the difference value of |R11−(R02+R20)/2| with the threshold value T. Then, the defect determination circuit 11R determines whether the processing subject pixel R11 includes a pixel based on all of the comparison results to generate a determination signal indicative of the determination. For example, in the first embodiment, when at least one difference value is greater than the threshold value T (i.e., when the processing subject pixel R11 includes a defect), the defect determination circuit 11R generates the determination signal SR at a high level. When each one of the difference values is less than or equal to the threshold value T, the defect determination circuit 11R generates the determination signal SR at a low level.

In the same manner, the defect determination circuit 11G for the green color determines whether or not the processing subject pixel G11 includes a defect based on the green color data G11 and generates a determination signal SG indicative of the determination result. Further, the defect determination circuit 11B for the blue color determines whether or not the processing subject pixel B11 includes a defect based on the blue color data Bin and generates a determination signal SB indicative of the determination result.

The determination signals SR, SG, and SB for the three colors are provided to each of the correction circuits 12R, 12G, and 12B. More specifically, each of the correction circuits 12R, 12G, and 12B is provided with a synthesized signal generating by obtaining the logical sum of the determination signals SR, SG, and SB, which are generated by the defect determination circuits 11R, 11G, and 11B.

When at least one of the three processing subject pixels R11, G11, and B11 includes a defect, each of the correction circuits 12R, 12G, and 12B corrects the pixel value of the corresponding processing subject pixel R11, G11, and B11 based on the synthesized signal to generate a corrected pixel value. For example, based on the synthesized signal (i.e., three determination signals SR, SG, and SB), the red color correction circuit 12R uses the pixel value for the processing subject pixel R11 and the pixel values for the peripheral pixels to correct the pixel value of the pixel R11. To obtain the corrected value, the average value of the pixel values for the peripheral pixels is calculated and used as the corrected value for the processing subject pixel.

In the same manner, the green correction circuit 12G corrects the pixel value of the processing subject pixel G11 based on the synthesized signal (determination signals SR, SG, and SB). Further, the blue correction circuit 12B corrects the pixel value of the processing subject pixel B11 based on the synthesized signal (determination signals SR, SG, and SB).

When at least one of the three processing subject pixels R11, G11, and B11 includes a defect, the image processing circuit 10 corrects the pixel value of each one of the processing subject pixels R11, G11, and B11. This prevents color differences, which would be caused by defects.

When a pixel has the structure shown in FIG. 2, if the pixel sensor PR includes a defect, there is a high possibility that the other pixel sensors PG and PB in the same pixel also include defects. In the prior art correction method, for example, when the red pixel (pixel sensor) includes a defect, defects in the pixels (pixel sensor) of the other colors (G and B) may not be detected depending on the color of the image subject even though the G and B pixels include defects.

The image processing circuit 10 of the present invention corrects the pixel values of each of the pixels R11, G11, and B11 when at least one of the processing subject pixels R11, G11, and B11 for the three colors includes a defect. This prevents color differences that would be caused by defects.

The image processing circuit 10 of the first embodiment has the advantages described below.

Based on the difference values, which are obtained from the pixel value for the processing subject pixel R11 in the red color data Rin and the pixel values of the corresponding peripheral pixels, and the predetermined threshold value T, the defect determination circuit 11R for the red color determines whether or not the processing subject pixel R11 includes a defect and generates the determination signal SR. In the same manner, the defect determination circuits 11G and 11B for the green and blue colors generate the determination signals SG and SB respectively associated with the green and blue processing subject pixels G11 and B11. Based on the synthesized signal of the three determination signals SR, SG, and SB, the correction circuits 12R, 12G, and 12B generate the correction pixel values for the processing pixel values SR, SG, and SB using, for example, the pixel values of the corresponding peripheral pixels. Accordingly, when at least one of the processing subject pixels includes a defect, each of the correction circuits 12R, 12G, and 12B generates a corrected pixel value for the corresponding pixel. As a result, when any one of the processing subject pixels R11, G11, and B11 includes a defect, the processing subject pixels R11, G11, and B11 are all corrected. This reduces color differences.

An image processing circuit 20 according to a second embodiment of the present invention will now be discussed with reference to FIG. 3.

Figure 3:
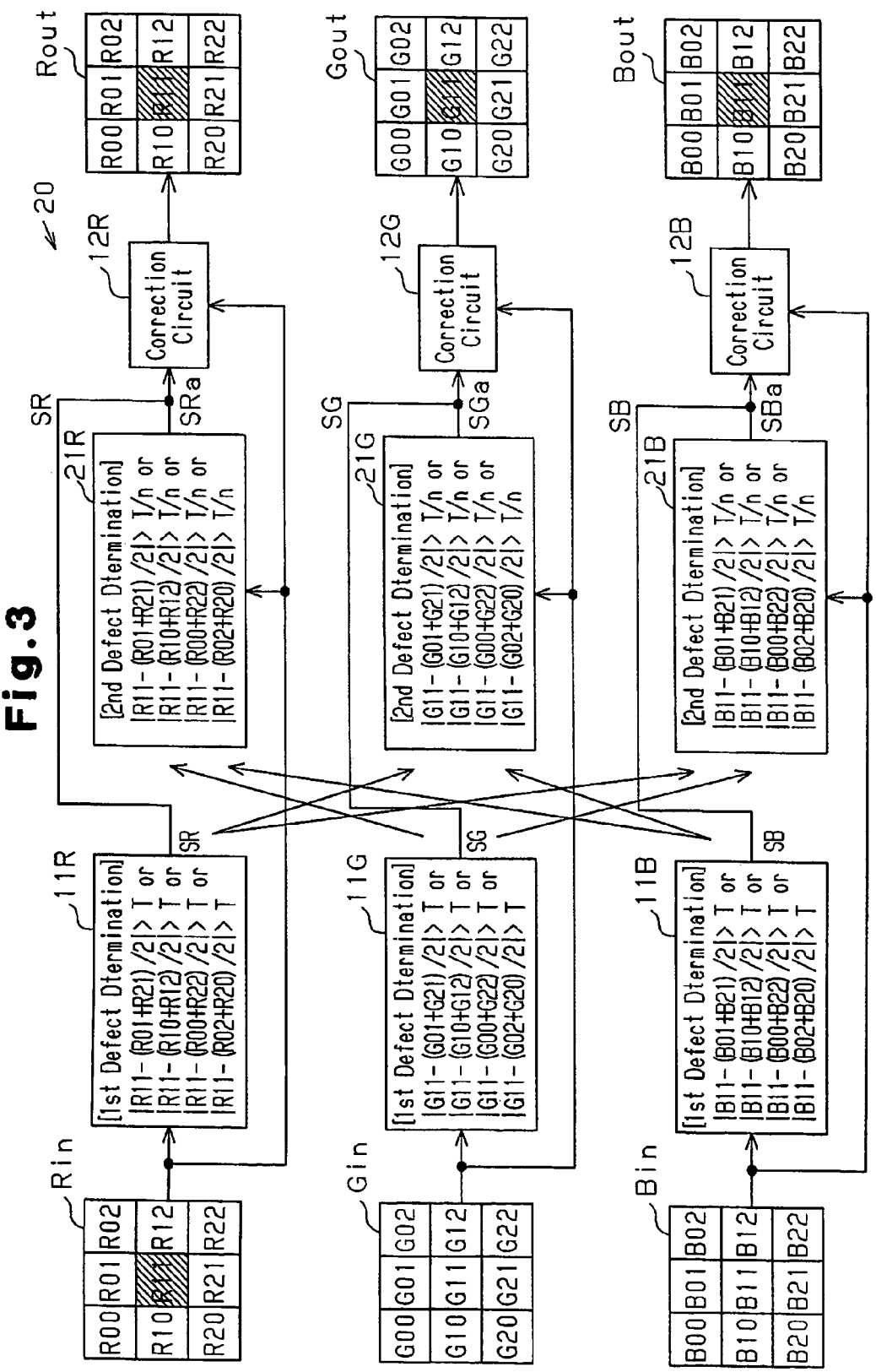
FIG. 3 is a schematic block diagram of an image processing circuit according to a second embodiment of the present invention.

Referring to FIG. 3, the image processing circuit 20 includes first defect determination circuits 11R, 11G, and 11B, second defect determination circuits 21R, 21G, and 21B, and correction circuits 12R, 12G, and 12B corresponding to red, green, and blue, respectively. First and second threshold values are set beforehand for the first and second defect determination circuits, respectively.

In the same manner as the first embodiment, the first defect determination circuits 11R, 11G, and 11B perform a first determination process to determine whether or not the processing subject pixels R11, G11, and B11 include a defect based on the corresponding color data Rin, Gin, and Bin. Then, the first defect determination circuits 11R, 11G, and 11B generate first determination signals SR, SG, and SB, respectively.

When the processing subject pixel for a different color includes a defect (in the second embodiment, either one of the other two pixels), the second defect determination circuits 21R, 21G, and 21B perform a second determination process based on the first determination signals and generate second determination signals SRa, SGa, and SBa. The second determination process is performed by using a second threshold value, which is equal to 1/n (n being a positive number that is greater than 1) of the first threshold value T used by the first defect determination circuits 11R, 11G, and 11B. More specifically, the second defect determination circuits 21R, 21G, and 21B compares the second threshold value T/n with a difference value, which is the same as that used by the first defect determination circuit. Based on the comparison result, the second defect determination circuits 21R, 21G, and 21B determine whether or not the pixel sensors (processing subject pixels R11, G11, and B11) of the corresponding color include defects. Then, the second defect determination circuits 21R, 21G, and 21B generate second determination signals SRa, SGa, and SBa indicative of the determination results.

For example, when at least either one of the processing subject pixels G11 and B11 for the green and blue colors includes a defect, the second defect determination circuit 21R for the red color determines whether or not the processing subject pixel R11 for the red color includes a defect based on the first determination signal SG of the first determination circuit 21G for the green color and the first determination signal SB of the first defect determination circuit 21B for the blue color. More specifically, the second defect determination circuit 21R calculates a difference value |R11−(R01+R21)/2| from the pixel value for the processing subject pixel R11 and the pixels values for the peripheral pixels R01 and R21. Then, the second defect determination circuit 21R compares the difference value |R11−(R01+R21)/2| with the second threshold value T/n. In the same manner, the second defect determination circuit 21R compares a difference value |R11−(R10+R12)/2| with the second threshold value T/n, a difference value |R11−(R00+R22)/2| with the second threshold value T/n, and a difference value |R11−(R02+R20)/2| with the second threshold value T/n. Based on each of the comparison results, the second defect determination circuit 21R determines whether or not the processing subject pixel R11 includes a defect and generates a second determination signal SRa indicative of the determination result. In the second embodiment, when at least one of the difference values is greater than the second threshold value T/n, the second defect determination circuit 21R determines that the processing subject pixel R11 includes a defect and generates the second determination signal SRa at a high level. When the difference values are all less than or equal to the second threshold value T/n, the second defect determination circuit 21R generates the second determination signal SRa at a low level.

The second defect determination circuit 21R determines whether the processing subject pixel R11 includes a defect by using the second threshold value T/n, which is less then the first threshold value T of the first defect determination circuit 11R. Then, the second defect determination circuit 21R generates the second determination signal SRa that is indicative of the determination result.

In the same manner, when at least either one of the processing subject pixels R11 and B11 for the red and blue colors includes a defect, the second defect determination circuit 21G for the green color determines whether or not the processing subject pixel G11 for the green color includes a defect based on the first determination signals SR and SB of the first defect determination circuits 11R and 11B respectively corresponding to the red and blue colors. Similarly, when at least either one of the processing subject pixels R11 and G11 for the red and green colors includes a defect, the second defect determination circuit 21B for the blue color determines whether or not the processing subject pixel B11 for the blue color includes a defect based on the first determination signals SR and SG of the first defect determination circuits 11R and 11G respectively corresponding to the red and green colors.

In the same manner as the first embodiment, when at least either one of the first determination signal SR of the first defect determination circuit 11R and the second determination signal SRa of the second defect determination circuit 21R indicates that there is a defect (high level), the correction circuit 12R for the red color corrects the pixel value for the corresponding processing image pixel R11 to generate a corrected pixel value based on the signals SR and Sra. When at least either one of the first determination signal SG of the first defect determination circuit 11G and the second determination signal SGa of the second defect determination circuit 21G indicates that there is a defect (high level), the correction circuit 12G for the green color corrects the pixel value for the corresponding processing image pixel G11 to generate a corrected pixel value based on the signals SG and SGa. When at least either one of the first determination signal SB of the first defect determination circuit 11B and the second determination signal SBa of the second defect determination circuit 21B indicates that there is a defect (high level), the correction circuit 12B for the blue color corrects the pixel value for the corresponding processing image pixel B11 to generate a corrected pixel value based on the signals SB and SBa.

The operation of the image processing circuit 20 will now be discussed.

It is assumed here that the first defect determination circuit 11R for the red color is generating the determination signal SR at a high level to indicate that the pixel R11 has a defect. Further, the first defect determination circuits 11G and 11B for the green and blue colors are respectively generating the determination signals SG and SB at low levels indicating that the pixels G11 and B11 are free of defects.

The first determination signals SG and SB for the green and blue colors indicate that there are no defects. Thus, the second defect determination circuit 21R for the red color does not perform the second determination process. The first determination signal SR for the red color indicates that there is a defect. Therefore, the second defect determination circuit 21G for the green color performs the second determination process. The second defect determination circuit 21G may determine that at least one of the difference values is greater than the second threshold value T/n. In such a case, the second defect determination circuit 21G generates the second determination signal SGa at a high level to indicate that the pixel G11 includes a defect. Further, since the first determination signal SR for the red color indicates that there is a defect, the second defect determination circuit 21B for the blue color performs the second determination process. The second defect determination circuit 21B may determine that the difference values are all less than the second threshold value T/n. In such a case, the second defect determination circuit 21B generates the second determination signal SBa at a low level to indicate that the pixel B11 is free from defects.

Based on the first determination signal SR, which indicates that there is a defect, the correction circuit 12R for the red color performs the correction process to generate a corrected pixel value for the processing subject pixel R11. Based on the second determination signal SGa, which indicates that there is a defect, the correction circuit 12G for the green color performs the correction process to generate a corrected pixel value for the processing subject pixel G11. Based on the first determination signal SB and second determination signal SBa, each indicating that there is no defect, the correction circuit 12B for the blue color does not perform the correction process.

The image processing circuit 20 of the second embodiment has the advantages described below.

Based on the first threshold value and the difference values, which are obtained from the pixel value of the processing subject pixel R11 and the pixel values of the peripheral pixels, the first defect determination circuit 11R for the red color determines whether or not the processing subject pixel R11 includes a defect and generates the first determination signal SR. In the same manner, the first defect determination circuits 11G and 11b for the green and blue colors generate the first determination signals SG and SB, respectively. Based on the determination result of the first defect determination circuits 11G and 11B for different colors (green and blue), the second defect determination circuit 21R determines whether or not the processing subject pixels G11 and B11 include defects. When at least any one of the processing subject pixels G11 and B11 includes a defect, the second defect determination circuit 21R determines whether or not the processing subject pixel R11 includes a defect by using the difference values and the second threshold value T/n, which is less than the first threshold value, and generates the second determination signal SRa. In the same manner, the second defect determination circuits 21G and 21B for the green and blue colors generate the second determination signals SGa and SBa, respectively. When the processing subject pixel R11 includes a defect, the correction circuit 12R calculates a corrected pixel value for the pixel R11 from the pixel value of the pixel R11 and the pixel values of the peripheral pixels. The correction circuits 12G and 12B for the green and blue colors perform the same process as the correction circuit 12R. As a result, even if a pixel is once determined as being free from defects by the first defect determination circuits 11R, 11G, or 11B, the second defect determination circuit 21R, 21G, or 21B may determine that the pixel includes a defect. The determination of whether or not a pixel includes a defect is accurately performed. This results in further optimal correction of the pixel values and further reduces color differences. Furthermore, when determining that the corresponding pixel is free from defects, the second defect determination circuits 21R, 21G, and 21B do not correct that corresponding pixel even if the other pixels are corrected. Thus, in the second embodiment, the pixels for each color are corrected independently. This avoids the generation of unnecessary corrected values. Accordingly, the pixel value of a processing subject pixel is prevented from differing from the actual color of the image subject.

It should be apparent to those skilled in the art that the present invention may be embodied in many other specific forms without departing from the spirit or scope of the invention. Particularly, it should be understood that the present invention may be embodied in the following forms.

The threshold value (first threshold value) T of the first defect determination circuits 11R, 11G, and 11B and the second threshold value T/n of the second defect determination circuits 21R, 21G, and 21B may be varied for each color or each pixel.

The peripheral pixels located proximal to the processing subject pixel are not limited to the eight pixels arranged around the processing subject pixel.

A versatile spatial filter may be used for the correction circuits 12R to 12B to calculate the corrected values. For example, each pixel value of the processing subject pixel R11 and the peripheral pixels R00 and R22 may be multiplied by a filter coefficient to use the total sum of the products as a corrected value. Alternatively, the total sum may be added to the original pixel value to obtain a corrected value. Further, a median filter may be used. This would facilitate the calculation of the corrected value based on the pixel value of the processing subject pixel and the pixel values of the proximal pixels (peripheral pixels).

The present examples and embodiments are to be considered as illustrative and not restrictive, and the invention is not to be limited to the details given herein, but may be modified within the scope and equivalence of the appended claims.

What is claimed is:

1. An image processing circuit for processing color data generated by a solid state imaging device, wherein the solid state imaging device includes a matrix of a plurality of pixels, with each pixel including a plurality of sub-pixels arranged in a plurality of superimposed layers, and each sub-pixel corresponding to different color data, the image processing circuit comprising:

a plurality of first defect determination circuits respectively arranged in correspondence with the plurality of sub-pixels, with the sub-pixel corresponding to each first defect determination circuit defining a first sub-pixel, and a sub-pixel arranged near the first sub-pixel in the same layer as the first sub-pixel defining a second sub-pixel, wherein each of the first defect determination circuits determines whether or not the corresponding first sub-pixel includes a defect based on the color data of the first sub-pixel and the color data of the second sub-pixel and generates a first determination signal;

a plurality of second defect determination circuits respectively arranged in correspondence with the plurality of sub-pixels, with each of the second defect determination circuits being connected to one or more first defect determination circuits associated with one or more first sub-pixels differing from the corresponding first sub-pixel, wherein when the one or more first defect determination circuits associated with the one or more different first sub-pixels generates the first determination signal indicative of a defect, each second defect determination circuit determines whether or not the corresponding first sub-pixel includes a defect based on the color data of the first sub-pixel and the color data of the second sub-pixel and generates a second determination signal; and a plurality of correction circuits respectively arranged in correspondence with the plurality of sub-pixels, with each of the correction circuits being connected to the corresponding first and second defect determination circuits, wherein each of the correction circuits generates a corrected value for the corresponding first sub-pixel based on the color data of the first sub-pixel and the color data of the second sub-pixel when at least one of the first and second determination signals is indicative of a defect.

2. The image processing circuit according to claim 1, wherein:

each of the first defect determination circuits uses the color data of the first sub-pixel, the color data of the second sub-pixel, and a first threshold value to determine whether or not the first sub-pixel includes a defect; and each of the second defect determination circuits uses the color data of the first sub-pixel, the color data of the second sub-pixel, and a second threshold value that is less than the first threshold value to determine whether or not the first sub-pixel includes a defect.

3. The image processing circuit according to claim 2, wherein:

the color data of the first sub-pixel is a pixel value of the first sub-pixel;

the color data of the second sub-pixel is an average value of pixel values of a plurality of sub-pixels adjacent to the first sub-pixel;

each of the first defect determination circuits compares the first threshold value with a difference between the pixel value of the first sub-pixel and the average pixel value of the sub-pixels adjacent to the first sub-pixel and determines whether or not the first sub-pixel includes a defect based on the comparison result; and each of the second defect determination circuits compares the second threshold value with a difference between the pixel value of the first sub-pixel and the average pixel value of the sub-pixels adjacent to the first sub-pixel and determines whether or not the first sub-pixel includes a defect based on the comparison result.

4. A method for processing color data generated by a solid state imaging device, wherein the solid state imaging device includes a matrix of a plurality of pixels, with each pixel including a plurality of sub-pixels arranged in a plurality of superimposed layers, and each sub-pixel corresponding to different color data, the method comprising:

providing each of a plurality of first defect determination circuits respectively corresponding to the plurality of sub-pixels with color data of the corresponding sub-pixel defining a first sub-pixel and color data of a sub-pixel defining a second sub-pixel that is arranged near the first sub-pixel in the same layer as the first-sub pixel;

generating a first determination signal by determining whether or not the first sub-pixel includes a defect based on the color data of the first sub-pixel and the color data of the second sub-pixel with the corresponding first defect determination circuit;

providing each of a plurality of second defect determination circuits respectively corresponding to the plurality of sub-pixels with one or more first determination signals of one or more first defect determination circuits associated with one or more first sub-pixels differing from the corresponding first sub-pixel;

generating a second determination signal by determining whether or not the first sub-pixel includes a defect based on the color data of the first sub-pixel and the color data of the second sub-pixel with the corresponding second defect determination circuit when the one or more first defect determination circuits associated with the one or more different first sub-pixels generates the first determination signal indicative of a defect;

providing each of a plurality of correction circuits respectively corresponding to the plurality of sub-pixels with the first determination signal of the corresponding first defect determination circuit and the second determination signal of the corresponding second defect determination circuit; and generating a corrected value for the first sub-pixel with the corresponding correction circuit based on the color data of the first sub-pixel and the color data of the second sub-pixel when at least one of the first and second determination signals is indicative of a defect.

5. The method according to claim 4, wherein:

said generating a first determination signal includes using the color data of the first sub-pixel, the color data of the second sub-pixel, and a first threshold value to determine whether or not the first sub-pixel includes a defect; and said generating a second determination signal includes using the color data of the first sub-pixel, the color data of the second sub-pixel, and a second threshold value that is less than the first threshold value to determine whether or not the first sub-pixel includes a defect.

6. The method according to claim 5, wherein:

the color data of the first sub-pixel is a pixel value of the first sub-pixel;

the color data of the second sub-pixel is an average value of pixel values of a plurality of sub-pixels adjacent to the first sub-pixel; and said generating the first determination signal includes comparing the first threshold value with a difference between the pixel value of the first sub-pixel and the average pixel value of the sub-pixels adjacent to the first sub-pixel; and said generating the second determination signal includes comparing the second threshold value with a difference between the pixel value of the first sub-pixel and the average pixel value of the sub-pixels adjacent to the first sub-pixel.

* * * * *